(12) United States Patent
Grabow et al.

(10) Patent No.: US 8,442,722 B2
(45) Date of Patent: May 14, 2013

(54) CORNER UNIT GUIDANCE CONTROL SYSTEM USING TWO ANTENNAS

(75) Inventors: John Grabow, Ft. Calhoun, NE (US); Wayne Choat, Edward, NE (US); Reece Andrews, Arlington, NE (US); Jochen Pfrenger, Omaha, NE (US); George Williard, Lincoln, NE (US); Linda L. Willard, legal representative, Lincoln, NE (US)

(73) Assignee: Lindsay Corporation, Omaha, NE (US)

( * ) Notice: Subject to any disclaimer, the term of this patent is extended or adjusted under 35 U.S.C. 154(b) by 386 days.

(21) Appl. No.: 12/964,488

(22) Filed: Dec. 9, 2010

(65) Prior Publication Data

US 2011/0153161 A1    Jun. 23, 2011

Related U.S. Application Data

(60) Provisional application No. 61/285,066, filed on Dec. 9, 2009.

(51) Int. Cl.
    *A01B 69/00*    (2006.01)
(52) U.S. Cl.
    USPC .......................................................... 701/41

(58) Field of Classification Search ........................ None
    See application file for complete search history.

(56) References Cited

U.S. PATENT DOCUMENTS

| 6,975,229 | B2 * | 12/2005 | Carrender | 340/572.4 |
| 8,386,111 | B2 * | 2/2013 | Cox et al. | 701/23 |
| 2004/0027243 | A1 * | 2/2004 | Carrender | 340/568.1 |

* cited by examiner

*Primary Examiner* — Thomas Tarcza
*Assistant Examiner* — Adam Alharbi
(74) *Attorney, Agent, or Firm* — Hovey Williams LLP

(57) ABSTRACT

A corner unit guidance control system for use with a corner unit that is part of a center pivot irrigation system includes a primary antenna, a secondary antenna, a receiver, and a controller. The primary antenna and the secondary antenna may receive signals from at least one external positional information source. The receiver may be in communication with the antennas and operable to process the signals to produce position data corresponding to a current position of a wheel and altitude data about the height of the antennas. The controller may be in communication with the receiver and may be programmed to steer the wheel to a heading corresponding to a difference between the current position of the wheel and a point along the path and further programmed to calculate a tilt angle from the altitude data and adjust the heading based on the tilt angle.

17 Claims, 5 Drawing Sheets

CORNER UNIT GUIDANCE CONTROL SYSTEM USING TWO ANTENNAS

RELATED APPLICATIONS

This non-provisional patent application claims priority benefit with regard to all common subject matter of the earlier filed U.S. Provisional Patent Application titled "GPS CORNER GUIDANCE CONCEPT USING TWO ANTENNAS", Ser. No. 61/285,066, filed on Dec. 9, 2009, which is hereby incorporated by reference in its entirety into the present application.

BACKGROUND OF THE INVENTION

1. Field of the Invention

Embodiments of the present invention relate to center pivot irrigation systems that include a corner unit. More particularly, embodiments of the present invention relate to guidance control systems for controlling the route followed by corner units of center pivot irrigation systems.

2. Description of the Related Art

Center pivot irrigation systems are typically used for crop irrigation and generally include a pipeline connected to a fluid source, a plurality of towers, and a plurality of mechanical drive units. The fluid source may be a tank, a well, or a similar source that has a fixed location. The pipeline may include a plurality of fluid-spraying sprinklers distributed along its length, wherein one end of the pipeline is rotatably coupled to the fluid source. The towers generally support the pipeline and are spaced apart such that several sprinklers are located between each tower. The mechanical drive units may include an electric motor or a similar source of propulsion. Each tower may also include one or more wheels that are fixed in orientation and driven by a mechanical drive unit. In general, the mechanical drive units propel the towers and the pipeline around the fluid source to provide crop irrigation over a circular area.

When the boundaries of the crops to be irrigated are irregular or non-circular, an extendable corner unit may be added to the free end of the pipeline to more fully irrigate the irregular or non-circular area. The corner unit may include additional pipeline and sprinklers as well as at least one tower with a mechanical drive unit and one or more steerable wheels.

SUMMARY OF THE INVENTION

Corner units of center pivot irrigation systems may be deployed in areas with rough terrain. Traveling on a sloped or hilly surface, as compared with a flat surface, could affect the steering of the corner unit wheels and the balance of the corner unit itself. On a steep slope, the corner unit could possibly tip and fall over. Embodiments of the invention provide a guidance control system for the corner unit that utilizes two antennas to determine when the corner unit is traveling along a slope. The guidance control system may adjust the heading of the wheels to compensate for the slope and may cease operation of the corner unit if a tip over is detected.

One embodiment of the guidance control system broadly comprises a primary antenna, a secondary antenna, a receiver, and a controller. The primary antenna and the secondary antenna may receive signals from at least one external positional information source. The secondary antenna may be spaced apart from the primary antenna with both antennas coupled to a rail that is positioned at a right angle with respect to a central vertical plane through a wheel of the corner unit. The receiver may be in communication with the antennas and operable to process the signals to produce position data corresponding to a current position of the wheel and altitude data about the height of the antennas. The controller may be in communication with the receiver and may be programmed to steer the wheel to a heading corresponding to a difference between the current position of the wheel and a point along the path and further programmed to calculate a tilt angle from the altitude data and adjust the heading based on the tilt angle. If the future heading is different from the current heading, then the controller may transmit a signal to a wheel steering unit to rotate the wheel about the vertical axis to an angle corresponding to the future heading.

Another embodiment of the present invention may include a method of steering a wheel coupled to a tower of a corner unit along a path. An embodiment of the method may comprise the steps of determining a current tilt angle of the tower; generating a signal to cease the drive and steering operations of the corner unit if the tilt angle is outside of a range of values; acquiring a current position of a center of the wheel with a primary antenna and a secondary antenna; calculating a point along the path that is a radial distance from the current position; calculating a future heading as the vector difference between the point and the current position; adjusting the future heading for a non-zero tilt angle according to the sign and value of the tilt angle; and steering the wheel to match the future heading.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
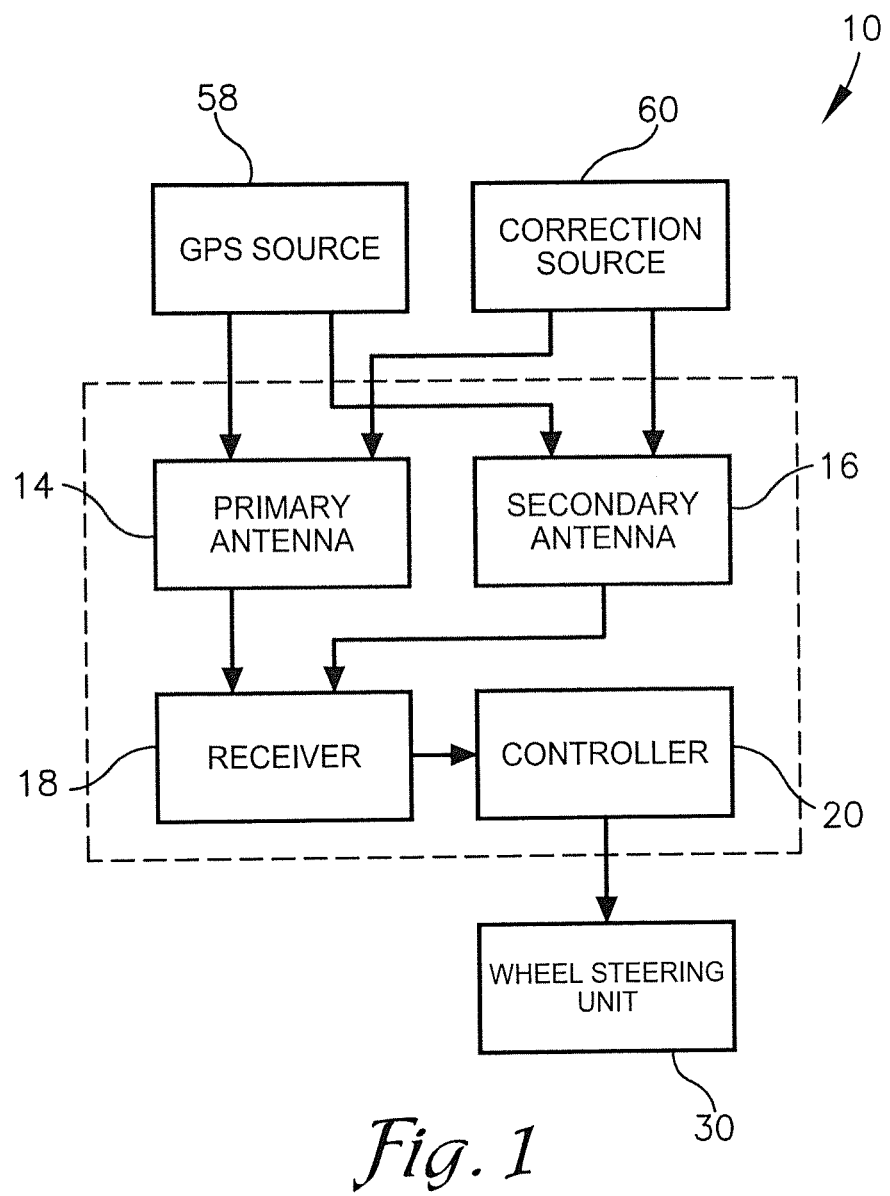
FIG. 1 is a block diagram of a guidance control system, constructed in accordance with various embodiments of the present invention, for use with a corner unit that is part of a center pivot irrigation system.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

A guidance control system 10, constructed in accordance with various embodiments of the current invention, for use with a corner unit 12 that is part of a center pivot irrigation system is shown in FIG. 1. The guidance control system 10 may broadly comprise a primary antenna 14, a secondary antenna 16, a receiver 18, and a controller 20.

The center pivot irrigation system, not completely shown in the figures, is generally utilized to irrigate crops or other farmland areas and may include a pipeline connected to a fluid source, a plurality of towers, and a plurality of mechanical drive units. The fluid source may be a tank, a well, or a similar source that has a fixed location. The pipeline may include a plurality of fluid-spraying sprinklers distributed along the length of the pipeline, wherein one end of the pipeline is rotatably coupled to the fluid source. The towers generally support the pipeline and are spaced apart such that several sprinklers are located between each tower. The mechanical drive units may include an electric motor or a similar source of propulsion. Each tower may also include one or more wheels that are fixed in orientation and driven by a mechanical drive unit. Driving of the wheels generally propels the pipeline to rotate in a circle around the fluid source. Given this basic setup, the center pivot irrigation system is operable to irrigate crops over a circular area. In order to irrigate land in an irregular or non-circular pattern, the corner unit 12 is added to the free end of the pipeline. An example of such a center pivot irrigation system is shown and described in more detail in U.S. patent application Ser. No. 12/431,462, filed Apr. 28, 2009, which is hereby incorporated by reference in its entirety into the present application.

Figure 2:
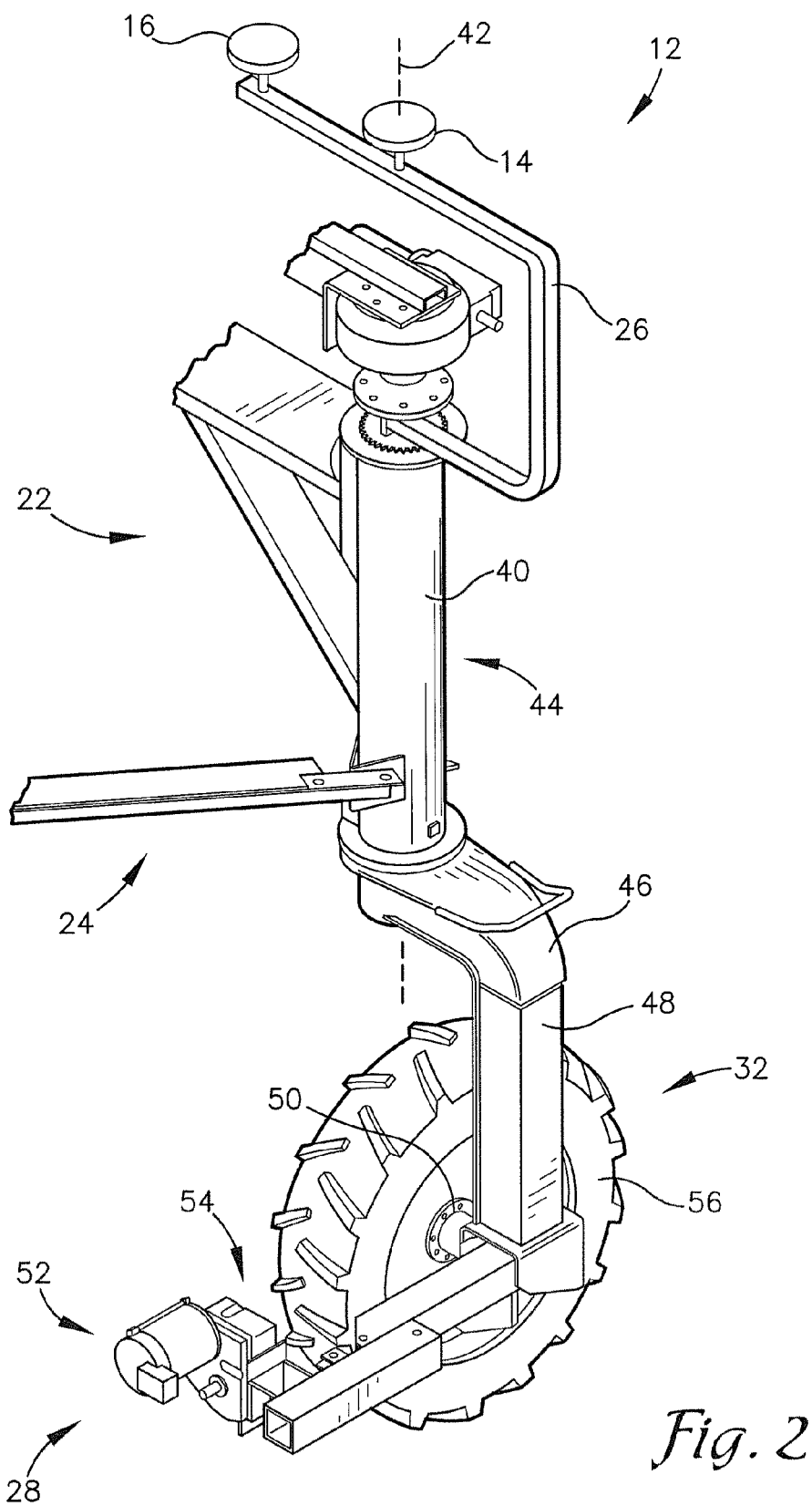
FIG. 2 is a perspective view of a portion of one embodiment of a tower of the corner unit.
Figure 3:
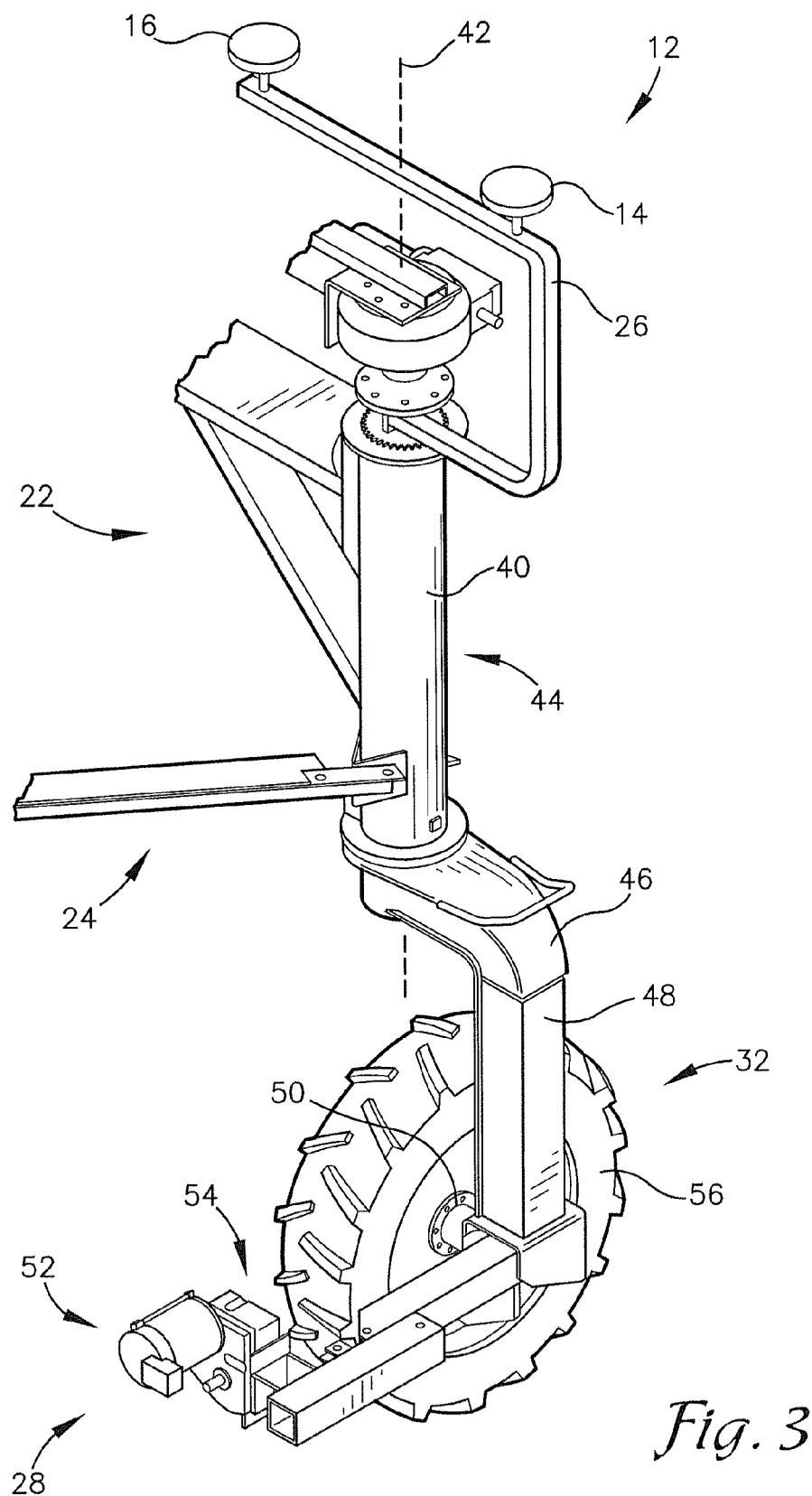
FIG. 3 is a perspective view of a portion of another embodiment of a tower of the corner unit.

The corner unit 12 may include additional pipeline and sprinklers as well as at least one tower 22, a portion of which is shown in FIGS. 2 and 3. The corner unit 12 comprises, in part, a frame 24, an antenna rail 26, a mechanical drive unit 28, a wheel steering unit 30, a forward wheel 32, and a coupling rail 34 and a rear wheel 36, both shown in FIG. 4.

In general, an overhang portion of the pipeline and the sprinklers may extend outward beyond the tower 22 in a direction away from the fluid source of the center pivot irrigation system. Thus, it is likely that there are crops located on the inward side of the tower 22 (toward the fluid source) and the outward side of the tower 22 (away from the fluid source). Accordingly, there may be a path 38, seen in FIG. 4, for the wheels 32, 36 to follow that includes crops or vegetation to be irrigated on both sides of the path 38.

The frame 24 may include trusses or portions thereof, or other mechanical support and strengthening structures to couple the pipeline to the forward wheel 32 and the rear wheel 36. The tower 22 may also include a tubular outer shaft 40 that is vertically oriented and coupled to the frame 24. The longitudinal axis of the outer shaft 40 may establish a centerline vertical axis 42. In addition, the tower 22 may include a tubular inner shaft 44 of a smaller diameter than the outer shaft 40 and positioned concentrically therewithin. The inner shaft 44 may also be able to rotate within the outer shaft 40.

A lower end of the inner shaft 44 may couple to a right-angle connector 46, which in turn couples to an arm 48 that is vertically oriented and positioned opposite the shaft 44. Thus, the arm 48 may rotate about the vertical axis 42 at a radial distance away from the vertical axis 42. The lower end of the arm 48 may couple to an axle 50 about which the forward wheel 32 rotates when the corner unit 12 is in motion. The arm 48 is generally greater in length than the radius of the forward wheel 32 by at least a few inches in order to provide clearance between the forward wheel 32 and the lower end of the inner shaft 44. Furthermore, the center of the forward wheel 32 is generally aligned with the vertical axis 42, such that the forward wheel 32 is generally positioned beneath the outer shaft 40 and the inner shaft 44.

The antenna rail 26 generally supports the primary antenna 14 and the secondary antenna 16. The antenna rail 26 may include any rigid material that maintains its shape under a slight load, such as hardened plastics or rubber or light metals. The antenna rail 26 may be rigidly coupled to the inner shaft 44 and shaped or positioned to extend in a direction that is roughly perpendicular to the plane of the forward wheel 32, which is also generally the direction of travel or the current heading discussed in more detail below. Thus, the longitudinal axis of the antenna rail 26 always maintains a right angle relative to the direction of travel of the forward wheel 32 even as the wheel 32 is steered in varying directions.

The mechanical drive unit 28 may include a motor 52 and a drive mechanism 54. The motor 52 is generally an electric AC or DC motor, as is known in the art, although the motor 52 may include additional or alternative sources of propulsion as well. An exemplary motor 52 is a 480 Volt motor. The drive mechanism 54 may receive mechanical input from the motor 52 and may include linkages, gears, gear boxes, and other mechanical components in order to rotate the forward wheel 32 about the axle 50 at the lower end of the arm 48.

The wheel steering unit 30, a portion of which is shown in FIGS. 2 and 3, may include one or more electric motors to directly or indirectly rotate the arm 48 with respect to the outer shaft 40. An exemplary embodiment of the wheel steering unit 30 may include a 480 Volt, three-phase motor coupled with two gear boxes, each gear box being coupled through a contactor. One gear box may steer the forward wheel 32 to the right, and the other gear box may steer the forward wheel 32 to the left. The gear boxes may be coupled to the inner shaft 44, such that rotation of the inner shaft 44 also rotates the forward wheel 32 about the vertical axis 42 in order to steer the corner unit 12. The wheel steering unit 30 may receive an electrical input, either a voltage level, a current level, or a digital code, from the controller 20 that instructs the wheel steering unit 30 to rotate the forward wheel 32 about the vertical axis 42, or steer the forward wheel 32 by a certain value, such as a certain number of degrees. The controller 20 may instruct the wheel steering unit 30 to steer the forward wheel 32 to an absolute bearing or to rotate the forward wheel 32 by a certain number of degrees relative to its current heading.

The forward wheel 32 may include a tire 56, typically manufactured from rubber, as is known in the art, that includes raised features along an outer wall of the tire 56 that generally maintain traction of the tire 56 over uneven or slick terrain. The forward wheel 32 may be coupled to the axle 50 at the lower end of the arm 48 and may be driven by the mechanical drive unit 28.

The rear wheel 36 may be substantially similar to the forward wheel 32 and may be connected to the arm 48, and by extension the forward wheel 32, through the coupling rail 34. The rear wheel 36 may be passively pulled or pushed by the motion of the forward wheel 32, or the rear wheel 36 may be linked to the drive mechanism 54 such that the motor 52 actively drives both the forward wheel 32 and the rear wheel 36. In some embodiments, the rear wheel 36 may have its own drive mechanism 54. Furthermore, the rear wheel 36 may be linked to the forward wheel 32 such that the rear wheel 36 and the forward wheel 32 are steered as a unit. Thus, the rear wheel 36 and the forward wheel 32 are always rotated to roughly the same heading.

The primary antenna 14 of the guidance control system 10 generally receives signals that can be decoded to determine three-dimensional positioning information. The primary antenna 14 may be appropriately shaped and sized to receive radio frequency signals from one or more satellite sources and one or more terrestrial sources. In some embodiments, such as the one of FIG. 2, the primary antenna 14 may be positioned on the antenna rail 26 generally above the upper end of the inner shaft 44, typically such that the center of the primary antenna 14 is placed along the vertical axis 42 and in turn is roughly above the center of the forward wheel 32. In other embodiments, such as the one of FIG. 3, the primary antenna 14 may be positioned on the antenna rail 26 offset from the vertical axis 42 at a known distance therefrom and in a direction away from the fluid source. Thus, the location of the center of the forward wheel 32 can be determined if the primary antenna 14 is positioned along the vertical axis 42 or if the primary antenna 14 is positioned at a known distance and angle from the vertical axis 42.

The secondary antenna 16 may be substantially similar to the primary antenna 14, but may be positioned on the opposing end of the antenna rail 26 in a direction toward the fluid source and at a distance away from the vertical axis 42. Generally, the line between the secondary antenna 16 and the primary antenna 14 is at an approximate right angle to a vertical plane along the vertical axis 42 through the center of the forward wheel 32 and the direction of travel of the forward wheel 32.

The antennas 14, 16 may receive information from a GPS source 58, such as the Global Positioning System satellite navigation system, that can be processed or decoded to determine a rough position in three dimensions—the surface position, such as latitude and longitude, and the altitude or height. The antennas 14, 16 may also receive correction information from a correction source 60, such as a Real Time Kinematic (RTK) system, which provides correction information about the GPS signal to increase the accuracy of the position determination from the GPS source 58. With the correction information, the position may be determined to within a few centimeters or less. The correction source 60 may be terrestrial-based and may include a dedicated or shared RTK base station plus radios (900 MHz ISM spread spectrum or licensed at approximately 450 MHz) or a public or commercial virtual reference station plus cellular or radio connections, or may be satellite-based such as OmniSTAR® with compatible receiving components.

The receiver 18 generally receives the signals from the antennas 14, 16 and decodes them to determine the position of both antennas 14, 16. The receiver 18 may include crystal oscillators and signal amplifiers as well as other components as are known in the art. The receiver 18 generally outputs the position, such as the latitude, longitude, and altitude, of the primary antenna 14 and the secondary antenna 16.

The controller 20 may include processors, microprocessors, microcontrollers, field-programmable gate arrays (FPGAs), similar programmable logic devices, or combinations thereof. The controller 20 may further include data storage components, or memory, such as random-access memory (RAM), read-only memory (ROM), erasable programmable read-only memory (EPROM), and the like, as well as hard drives, compact disc ROM (CDROM) drives, digital video disc (DVD) drives, flash drives, or the like, and combinations thereof. The controller 20 may also include data input devices, such as keypads, keyboards, mice, etc., and data output devices, such as monitors, displays, lighted indicators, printers, and the like. The controller 20 may additionally include ports to receive data from external sources such as hard wired ports to receive electrical data over a wire or cable, or radio-frequency (RF) ports to receive data wirelessly.

The controller 20 may be configured or programmed to execute instructions or operations which may be implemented in hardware, software, firmware, or combinations thereof. In various embodiments, the instructions may be included in a program which may be stored on a computer-readable medium such as RAM, ROM, EPROM, flash memory, a hard-disk drive, a floppy disk, a CD or CDROM or variations thereof, a DVD, a Blu-ray Disc™ (BD), and the like.

The controller 20 generally receives positional information about the position of the antennas 14, 16 from the receiver 18. In some embodiments, the controller 20 may have stored information about the path 38 that the wheels 32, 36 should follow. In other embodiments, the controller 20 may receive information about the path 38 from an external source. As discussed in more detail below, the controller 20 may output information or signals to the wheel steering unit 30 to adjust the heading of the forward wheel 32 based on the current position of the forward wheel 32, the current angle of the forward wheel 32, and the path 38 that the corner unit 12 is supposed to follow.

The controller 20 may also receive information about the altitude or height of the antennas 14, 16 from the receiver 18. The controller 20 may be able to determine the tilt of the antenna rail 26, and in general the tilt of the tower 22, by calculating the difference between the altitude readings of the primary antenna 14 and the secondary antenna 16. Since the distance between the antennas 14, 16 is known, the angle of tilt can be calculated. If the tilt angle is outside of a predetermined range, this may indicate a problem with the tower 22, such as being tipped over or stuck on a steep incline, or a problem with the antennas 14, 16 or the antenna rail 26, such as the rail 26 or one or both of the antennas 14, 16 having fallen off the tower 22. For example, the range may be from approximately 45° to approximately −45°. Tilt angle values outside of that range may indicate that the corner unit 12 is on a slope that is too steep for safe operation, or that the corner unit 12 has already tipped over. In such a situation, the controller 20 may shut off power to the mechanical drive unit 28 and the wheel steering unit 30, or may generate a signal to cease the drive and steering of the corner unit 12 or the entire center pivot irrigation system, and may generate a beacon or other emergency communication.

Alternatively, the controller 20 may use the tilt angle to adjust the steering of the forward wheel 32 to compensate for the slope of the land. For example, if the slope is generally in the same direction as the heading of the forward wheel 32, such as the forward wheel 32 going up or down a hill, then the controller 20 likely will not detect any tilt from the antennas 14, 16 and no adjustment to the heading of the forward wheel 32 may be necessary. However, if the slope is oriented at an angle with respect to the heading of the forward wheel 32, then the controller 20 may detect a non-zero tilt angle from the antennas 14, 16, indicating that the forward wheel 32 (and the tower 22) may be traveling along the side of a hill. Therefore, the controller 20 may adjust the heading of the forward wheel 32 to compensate for the tilt angle of the tower 22 in addition to adjusting the heading of the forward wheel 32 in order to follow the path 38. In general, there is a positive correlation between the tilt angle and the amount of adjustment to the heading of the forward wheel 32 to maintain the heading along the path 38, such that the greater the tilt angle, the greater the adjustment, and likewise, the smaller the tilt angle, the less the adjustment.

The guidance control system 10 may operate as follows. The antennas 14, 16 may receive positional and altitude information from the GPS source 58 and correction information from the correction source 60 in a continuous and real-time fashion as is typically determined and controlled by the external systems such as the Global Positioning System and an RTK or similar system. The antennas 14, 16 may communicate the signals with the positional, altitude, and correction information to the receiver 18 as they are received.

Some of the actions or operations of the guidance control system 10 described hereinafter generally occur once every update interval. The update interval may be a certain number of binary digital clock periods, such as a certain number of system clock cycles. Or, the update interval may be a certain real time period, such as a certain number of milliseconds or seconds.

The controller 20 may retrieve or receive the altitude information of the two antennas 14, 16 from the receiver 18 and determine the tilt angle. If the tilt angle is outside of a predetermined range of acceptable values, such as from approximately 45° to approximately −45° which may indicate a potential problem with the tower 22, then the controller 20 may generate a signal to cease the drive and steering of the corner unit 12. Otherwise, the controller 20 may temporarily store the value of the tilt angle.

Figure 4:
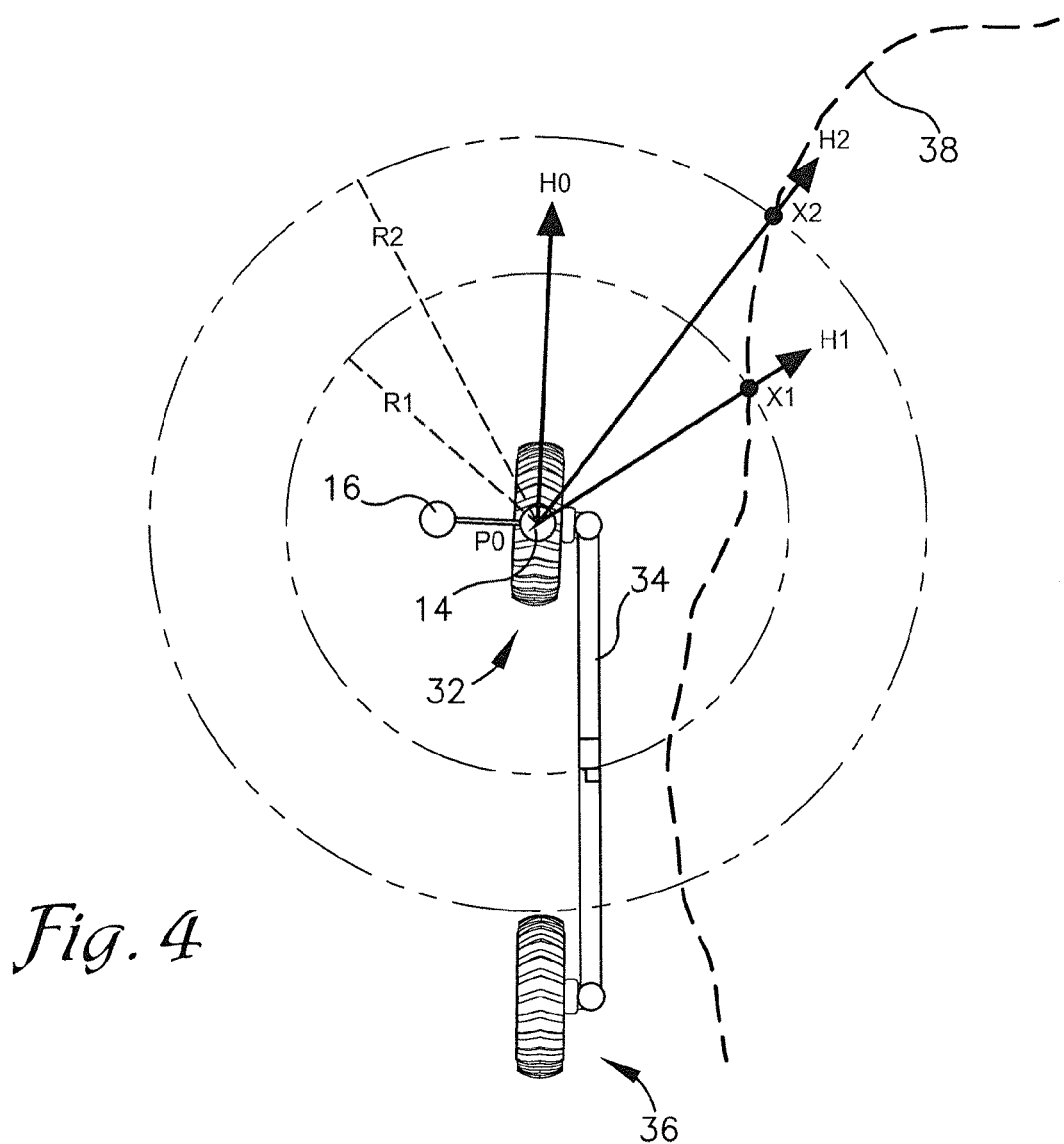
FIG. 4 is a schematic top view of a forward wheel and a rear wheel of the corner unit.

The controller 20 may retrieve or receive a current position P0, as shown in FIG. 4, of the forward wheel 32 from the receiver 18. Since the distance and angle of both antennas 14, 16 from the vertical axis 42 are known, the controller 20 may use the positional information from either one of the antennas 14, 16 or both to determine the position P0 of the forward wheel 32. The controller 20 may then determine a current heading H0. The controller 20 may calculate the heading H0 as the vector difference between the current position P0 and the last recorded position.

The controller 20 may calculate a first point X1 along the path 38 in the direction of travel that is a first radial distance R1 away from the current position P0. If the distance R1 does not intersect the path 38, perhaps as the result of the wheels 32, 36 drifting off course, then X1 may be calculated as the point on the path 38 that is closest the current position P0. The controller 20 may then calculate a first future heading H1 as the vector difference between the first point X1 and the current position P0. If the tilt angle is a non-zero value, then the controller 20 may adjust the first future heading H1 either clockwise or counterclockwise, depending on the direction of the slope of the land and in turn the sign of the tilt angle, and with a magnitude that is proportional to the value of the tilt angle. If the first future heading H1 is the same as the current heading H0, then no change to the wheels 32, 36 is made. Otherwise, if the first future heading H1 is different from the current heading H0, then the wheels 32, 36 are steered to match the first future heading H1. The steering may be accomplished by the controller 20 transmitting information or signals to the wheel steering unit 30 that adjusts the wheels 32, 36 to a certain angular or rotational position.

If smoother steering is desired, if the steering is updated less often, or if other parameters change, then the radial distance may change to a second radial distance R2 that is greater than R1. In a fashion similar to that described above, the controller 20 may calculate a second point X2 along the path 38 in the direction of travel that is second radial distance R2 away from the current position P0. The controller 20 may then calculate a second future heading H2 as the vector difference between the second point X2 and the current position P0. Also, as described above, the controller 20 may adjust the second future heading H2 for a non-zero tilt angle according to the sign and value of the tilt angle. If the second future heading H2 is the same as the current heading H0, then no change to the wheels 32, 36 is made, else the wheels 32, 36 are steered to match the second future heading H2.

In general, the radial distance may be adjusted as needed to achieve varying design criteria or requirements.

Figure 5:
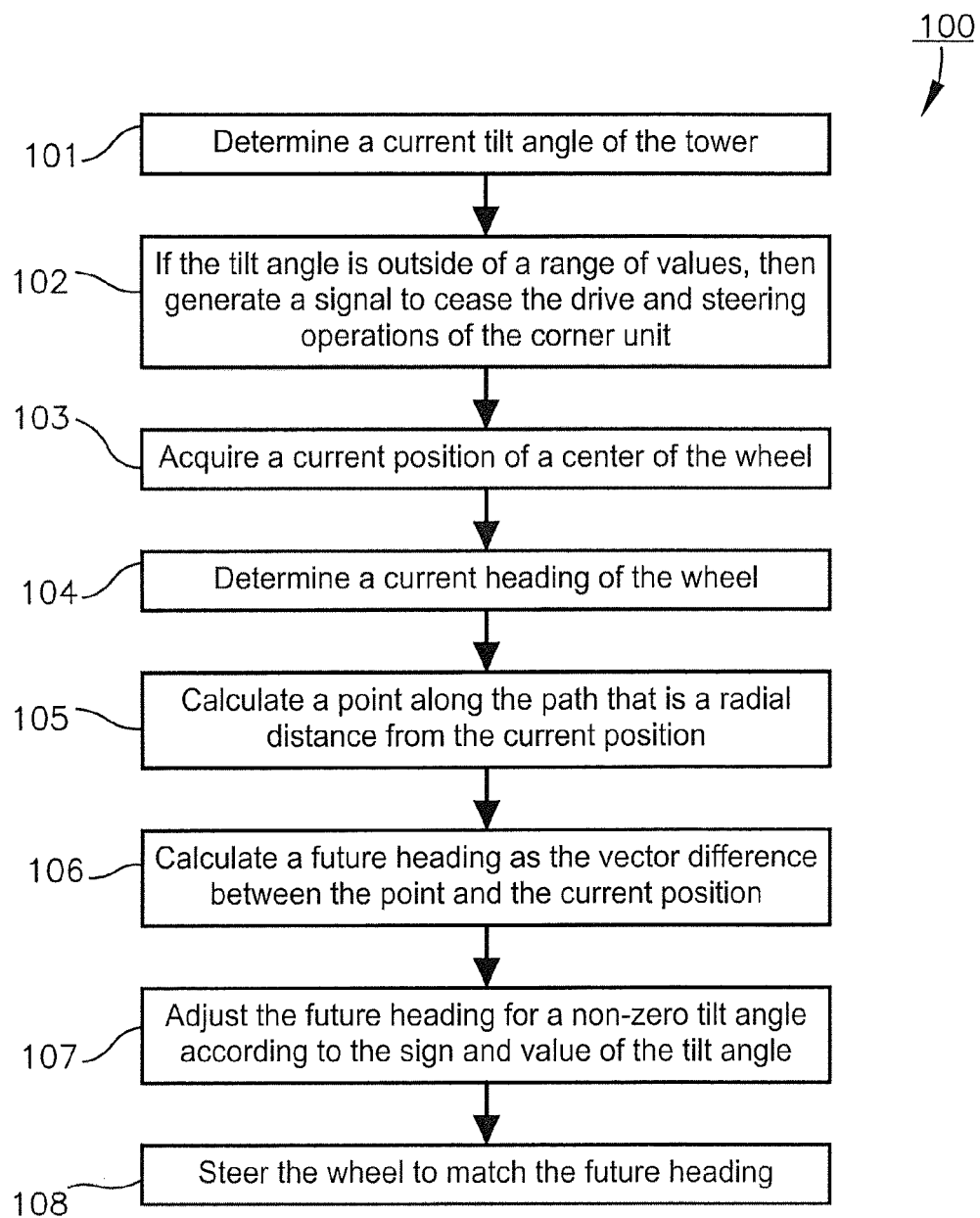
FIG. 5 is a flow diagram of at least a portion of the steps of a method of steering the forward wheel of the corner unit along a path using the guidance control system.

At least a portion of the steps of a method 100 for steering a wheel, such as the forward wheel 32, of a corner unit 12 along a path 38 using a guidance control system 10, in accordance with various embodiments of the current invention, is shown in FIG. 5. The steps may be performed in the order as shown in FIG. 5, or they may be performed in a different order. Furthermore, some steps may be performed concurrently as opposed to sequentially. In addition, some steps may be omitted. In various embodiments, a second or rear wheel 36 may be steered at the same time as the forward wheel 32.

Referring to step 101, a current tilt angle of a tower 22 of the corner unit 12 is determined. The tilt angle may be calculated from the difference in altitude between a primary antenna 14 and a secondary antenna 16 and the distance between the two antennas 14, 16. A controller 20 may receive the altitude information from a receiver 18.

Referring to step 102, if the tilt angle is outside of a predetermined range of values, then a signal is generated to cease the drive and steering of the corner unit 12. The controller 20 may check the tilt angle against the range of acceptable values, and may generate a signal to cease the drive and steering of the corner unit 12 and may shut off electrical power to the mechanical drive unit 28 and the wheel steering unit 30. The controller 20 may also initiate emergency communication. If the tilt angle is within the acceptable range, then the controller 20 may store the value.

Referring to step 103, a current position P0, as seen in FIG. 4, of the center of the forward wheel 32 is acquired. The antennas 14, 16 may receive GPS position information along with RTK correction information that is used to determine the position of the forward wheel 32 with high precision. Since the distance and angle of both antennas 14, 16 from a vertical axis 42 through the center of the forward wheel 32 are known, the controller 20 may use the positional information from either one of the antennas 14, 16 or both to determine the position P0 of the forward wheel 32. The controller 20 may retrieve or receive the positional information from the receiver 18.

Referring to step 104, a current heading H0 of the forward wheel 32 is determined. The current heading H0 may be calculated by a controller 20 that includes a processor, such as a microprocessor. The current heading H0 may be the vector difference between the current position P0 and the last recorded position.

Referring to step 105, a point X1, as seen in FIG. 4, along the path 38 is calculated that is a radial distance R1 away from the current position P0. The controller 20 may be used to calculate the point X1. In other embodiments, another point X2 may be calculated that is a radial distance R2 away from the current position P0.

Referring to step 106, a future heading H1 is calculated that is the vector difference between the point X1 and the current position P0. The controller 20 may be used to calculate the future heading H1. Alternatively, future heading H2 may be calculated as the vector difference between the point X2 and the position P0.

Referring to step 107, the future heading H1 is adjusted for a non-zero tilt angle according to the sign and value of the tilt angle. The controller 20 may adjust the future heading H1 either clockwise or counterclockwise, depending on the sign of the tilt angle, and with a magnitude that is proportional to the value of the tilt angle.

Referring to step 108, the forward wheel 32 is steered to match the future heading H1. The steering may be implemented with the controller 20 issuing information or signals to a wheel steering unit 30 that operates to rotate the forward wheel 32 about the vertical axis 42. If the future heading H1 matches the current heading H0, then no action is taken.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A guidance control system to guide a corner unit of a center pivot irrigation system along a path, the guidance control system comprising:
   a rail positioned at a right angle with respect to a central vertical plane through a wheel of the corner unit;
   a primary antenna coupled to the rail and operable to receive signals from at least one external positional information source;
   a secondary antenna spaced apart from the primary antenna on the rail, the secondary antenna operable to receive signals from at least one external positional information source;
   a receiver in communication with the primary antenna and the secondary antenna and operable to process the signals to produce position data corresponding to a current position of the wheel and to produce altitude data about the height of the primary antenna and the secondary antenna; and
   a controller in communication with the receiver, the controller programmed to steer the wheel to a heading corresponding to a difference between the current position of the wheel and a point along the path and further programmed to calculate a tilt angle from the altitude data and adjust the heading based on the tilt angle.

2. The guidance control system of claim 1, wherein the controller is further programmed to generate a signal to cease the drive and steering operations of the corner unit if the tilt angle is outside of a range of values.

3. The guidance control system of claim 1, wherein the antenna is further operable to receive global positioning system information.

4. The guidance control system of claim 3, wherein the antenna is further operable to receive global positioning system correction information.

5. The guidance control system of claim 1, wherein the controller is further programmed to transmit a signal to a wheel steering unit that adjusts the angular position of the wheel with respect to the vertical axis.

6. A tower for use with a corner unit of a center pivot irrigation system, the tower comprising:
   a wheel;
   a wheel steering unit coupled with the wheel and operable to steer the wheel;
   a rail positioned at a right angle with respect to a central vertical plane through the wheel;
   a primary antenna coupled to the rail and operable to receive signals from at least one external positional information source;
   a secondary antenna spaced apart from the primary antenna on the rail, the secondary antenna operable to receive signals from at least one external positional information source;
   a receiver in communication with the primary antenna and the secondary antenna and operable to process the signals to produce position data corresponding to a current position of the wheel and to produce altitude data about the height of the primary antenna and the secondary antenna; and
   a controller in communication with the receiver, the controller programmed to send a heading to the wheel steering unit corresponding to a difference between the current position of the wheel and a point along the path and further programmed to calculate a tilt angle from the altitude data and adjust the heading based on the tilt angle.

7. The tower of claim 6, further including a mechanical drive unit mechanically linked with the wheel and operable to propel the wheel.

8. The tower of claim 6, further including a frame with a shaft located along the central vertical plane, wherein the rail is coupled to a first end of the shaft and a second end of the shaft is coupled to the wheel through a right-angle connector and an arm.

9. The tower of claim 6, wherein the controller is further programmed to generate a signal to cease the drive and steering operations of the corner unit if the tilt angle is outside of a range of values.

10. The guidance control system of claim 6, wherein the antenna is further operable to receive global positioning system information.

11. The guidance control system of claim 10, wherein the antenna is further operable to receive global positioning system correction information.

12. A method of steering a wheel coupled to a tower of a corner unit along a path, the method comprising the steps of:
   a) determining a current tilt angle of the tower;
   b) acquiring a current position of a center of the wheel with a primary antenna and a secondary antenna;
   c) calculating a point along the path that is a radial distance from the current position;
   d) calculating a future heading as the vector difference between the point and the current position;
   e) adjusting the future heading for a non-zero tilt angle according to the sign and value of the tilt angle; and
   f) steering the wheel to match the future heading.

13. The method of claim 12, further including the step of determining a current heading of the wheel.

14. The method of claim 13, wherein the current heading is calculated as the vector difference between the current position and a previously recorded position.

15. The method of claim 13, further including the step of transmitting a signal to a wheel steering unit to rotate the wheel about a vertical axis through the center of the wheel if the future heading is different from the current heading.

16. The method of claim 12, wherein the tilt angle is determined from the height difference between the primary antenna and the secondary antenna and the distance therebetween.

17. The method of claim 12, further including the step of generating a signal to cease the drive and steering operations of the corner unit if the tilt angle is outside of a range of values.

\* \* \* \* \*